United States Patent [19]

Schultze

[11] Patent Number: 5,840,812
[45] Date of Patent: *Nov. 24, 1998

[54] WATERPROOF AND BREATHABLE FLAT MATERIALS MADE FROM RESIN MIXTURES OF THERMOPLASTIC POLYURETHANE

[75] Inventor: Dirk Schultze, Fallingbostel, Germany

[73] Assignee: Wolff Walsrode AG, Walsrode, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 561,988

[22] Filed: Nov. 22, 1995

[30] Foreign Application Priority Data

Nov. 29, 1994 [DE] Germany ............... 44 42 380.2

[51] Int. Cl.$^6$ ............... C08L 75/04; C08L 75/08; D06M 13/425; C08K 5/01
[52] U.S. Cl. ............... 525/458; 525/453; 525/457; 525/460; 8/192; 427/389.9; 427/392; 427/393.4; 427/394; 524/277; 524/487; 156/60; 428/304.4; 428/311.11; 428/311.51; 428/319.7; 428/423.1; 428/425.1
[58] Field of Search ............... 525/453, 457, 525/460, 458; 8/192; 427/389.9, 392, 393.4, 394; 524/277, 487; 156/60; 428/304.4, 311.11, 311.51, 319.7, 423.1, 425.1

[56] References Cited

U.S. PATENT DOCUMENTS

| | | | |
|---|---|---|---|
| 5,218,058 | 6/1993 | Zeitler et al. ............... | 525/453 |
| 5,238,732 | 8/1993 | Krishnan ............... | 428/267 |
| 5,239,037 | 8/1993 | Krishnan ............... | 528/28 |
| 5,331,044 | 7/1994 | Lausberg et al. ............... | 524/871 |
| 5,461,122 | 10/1995 | Yilgör et al. ............... | 525/474 |

FOREIGN PATENT DOCUMENTS

| | | |
|---|---|---|
| 0111682 | 6/1984 | European Pat. Off. . |
| 0399272 | 11/1990 | European Pat. Off. . |
| 0586132 | 3/1994 | European Pat. Off. . |
| 2021603 | 12/1979 | United Kingdom . |
| 8901346 | 2/1989 | WIPO . |

*Primary Examiner*—Rabon Sergent
*Attorney, Agent, or Firm*—Sprung Kramer Schaefer & Briscoe

[57] ABSTRACT

The present invention relates to waterproof but breathable flat materials prepared from the melt from polymer resin mixtures consisting of at least two different melt processable polyurethanes, wherein the different thermoplastic polyurethanes have soft segments with different chemical constitutions, wherein the thermoplastic polyurethane which forms the matrix is a polyurethane with a ether based soft segment, wherein the ether segment has a carbon/oxygen atomic ratio of at least two and at most three and is present at a rate of 70–95 wt. % with reference to the total weight of thermoplastic polyurethanes used for melt processing to produce a flat material, and wherein the flat materials according to the invention have a higher permeability to water vapour, determined according to DIN 53 122, and a lower water absorption, determined according to DIN 53 495, method C, than flat materials made from one of the polyurethanes used for the polymer resin mixture.

11 Claims, No Drawings

WATERPROOF AND BREATHABLE FLAT MATERIALS MADE FROM RESIN MIXTURES OF THERMOPLASTIC POLYURETHANE

The invention relates to mixtures of thermoplastic polyurethane elastomers which can be processed by extrusion. The mixtures according to the invention of compatible thermoplastic polyurethane elastomers with different soft segment components are characterised by homogeneous mixing of the rigid segment domains. Flat materials made from these mixtures provide an improved breathable character as compared with flat materials made from the pure starting materials used for these blends. Processing by extrusion enables the conversion of polymer mixtures according to the invention into breathable flat materials. Moreover, these absorb less water.

Furthermore it relates to the use of such flat materials for the waterproof covering of porous flat materials, particularly of textile woven goods and non-woven fabrics. This normally takes place by means of extrusion-coating or laminating films of the thermoplastic polyurethane elastomer resin mixtures according to the invention onto these porous materials.

It is already generally known that textiles, textile woven goods or similar porous flat materials can be made impermeable to the penetration or seepage of liquid components by providing them with a waterproof film or coating. Thermoplastic polyurethane (TPU) elastomers have already proved useful for this purpose. Their breathable properties, however, require further improvement.

The use of microporous sheets, as described, for example, in U.S. Pat. No. 4,194,041, is not an acceptable solution in many cases because these sheets have serious disadvantages, despite their high permeability. These comprise, in addition to poor elasticity, low mechanical stability, in particular poor resistance to abrasion In addition, such sheets cannot be further melt processed without completely altering their overall properties.

TPUs belong to the class of substances called thermoplastic elastomers. These comprise in general copolymers whose overall properties are produced by combining the respective properties of the individual components. Block copolymers have gained great importance in this class of substances. An informative review of these substances is given by Legge in: Rubber Chemistry and Technology 62 (1989) 529–547.

Thermoplastic polyurethanes have high mechanical strength and good resistance to chemicals, in spite of their elastic character. The three basic components of thermoplastic polyurethanes are diisocyanates, short-chain diols, also called chain extenders, and long-chain diols. The latter form the soft segments in TPUs. Diisocyanates and chain extenders together form the so-called rigid segment. For melt processability, the TPU must have a molecular chain structure which is as linear as possible; which can be achieved by the almost exclusive use of difunctional compounds.

The rigid segment determines in particular the strength of the thermoplastic polyurethane, wherein the high bond energy of the intermolecular hydrogen bonds which are characteristic of polyurethanes are causally responsible for this. The soft segment contributes the elastic component to the properties of TPUs. Selection of the soft segment is very important with respect to chemical interactions and chemical resistance.

In a commercial thermoplastic polyurethane, an association of good strength, i.e. tensile strength and tear propagation resistance, and therefore high extensibility and flexibility in the cold are striven for, along with the highest possible degree of resilience. A review of thermoplastic polyurethanes is given by Goyert and Hespe in: Kunststoffe 68 (1978) 819–825 or Hepburn (Editor: Polyurethane Elastomers, Applied Science Publishers, Barking (1982), p. 49–80.

The morphology of TPU is characterised by microphase separation, i.e. at the molecular level there are both rigid segment domains, in which the various molecules are held together by intermolecular hydrogen bonds, and soft segment domains whose special superlattice is determined by the chemical structure of the long-chain diols.

The currently obtainable commercial TPUs differ mainly in their soft segments. The most important difference is the difference in linkage of the soft segment monomers. Polyetherdiols and polyesterdiols may be differentiated, these both being used for soft segments. For all soft segment diols, an appropriate glass transition temperature is below room temperature so that the soft segments determine the elastic properties.

For breathable TPUs, polyetherdiols are preferably used, these having a more hydrophilic character than esterdiols. This type of application is described, for example, in DE 3425794 or DE 3538597.

If all the material transport involved relates to water or water vapour, long-chain diols with a soft segment with a high proportion of $C_2$-ethers are specified, i.e. they consist of ethylene oxide polymers. $C_2$-ether soft segments are characterised by their high degree of swelling in the presence of water and/or water vapour.

Processing such $C_2$-ether TPUs is limited by the tackiness due to the soft segment and by the mechanical requirements on the TPUS, which is why the proportion of soft segment cannot be increased at all. In parallel with this, the morphology of the soft segment phase is characterised by a high tendency towards crystallisation.

Improving the breathable character is generally possible by increasing the proportion of soft segment. This increase has a limit, however, at a proportion of approximately 60% of soft segment. Above this limit, melt processing is difficult to impossible due to deteriorating feeding behaviour. In addition, properties such as strength and water absorption are greatly impaired by the high proportion of soft segment.

The properties can also be modified by preparing TPUs using different long-chain diols. Mixtures of long-chain diols for synthesising TPUs on a laboratory scale have already been described by Chen, Eaton, Chang and Tobolsky in: Journal of Applied Science, 16 (1972) 2105–2114. However, when such mixtures are used during preparation by the reaction-extruder method, the mixing problems involved lead to non-uniform end products. In the case of known commercial products in particular to throughput variations in the melting extruder, so that very thin flat materials with the required quality cannot be produced continuously.

The reactive polyurethane coating systems described in DE 40 38 705, in which prepolymers are applied to supporting materials and cross-linked on the support, have the disadvantage that they can no longer be thermoformed after the film-forming process.

Although long-chain diols of copolymers are known, they are relatively expensive to produce. Moreover, if there is any modification to the overall properties, they have to be prepared individually and the associated process control has to be optimized. Thus, these have proved to be too inflexible and too expensive for application-specific or customer-specific production or formulation.

In addition to pure TPU films or membranes, various films made from polymer mixtures in which one component is a TPU are described in the literature. These relate, however, neither to mixtures of different TPUs nor to an improvement in their breathable character.

Blends or mixtures of different polymers with TPU have also been described on various occasions in the patent literature. Among others, EP 46071 describes mixtures of TPU with incompatible polymers which are characterised in that in the mixtures of polyurethane and incompatible polymer the latter forms a discrete phase within the continuous polyurethane matrix.

The coexistence of different phases is, as described in EP 526 858, utilised to improve the separating behaviour of polyurethane films. There, a harder, more rapidly crystallising material is introduced into an otherwise plastic matrix and thus produces an additional separating effect.

The matrix which is already microphase separated but relatively firm due to the intermolecular hydrogen bonds is weakened by the formation of larger discrete phases with lower mechanical strength. EP 526 858 specifies that the admixture of incompatible thermoplastic elastomers to give thermoplastic polyurethane-ether elastomers leads to a deterioration in the mechanical strength.

The object of improving breathable TPU films known per se from the prior art for textile applications within the scope of the present invention is produced by the demand for improved user comfort of the textiles, especially with regard to breathability, combined with retaining the same processing and application properties.

The demand for improved breathability, generally expressed as increased permeability to water vapour is often accompanied by the desire for reduced absorption of water. The reduced absorption of water has the advantage for the user, especially when using TPUs as a climatic membrane on breathable but water-resistant items of clothing, of the climatic membrane being less weighty. This produces increased comfort when worn.

Moreover, it is of advantage if the costs incurred during the production of breathable films can be reduced so these can be priced reasonably and thus be used by a wider clientele.

Finally it is also of advantage if the films can be designed as transparent or at least translucent so that the material covered by the films can be subjected to inspection through the film.

This object was achieved by a resin mixture of the type mentioned at the beginning which is characterised in that it is suitable for thermoforming to produce flat materials. These are characterised by their breathable character, their low degree of swelling in the presence of water and their impermeability to water.

It was not obvious to the person skilled in the art that the thermoplastic polyurethane raw materials used could be converted into this type of homogeneous mixture or that flat materials made from the latter are characterised by an improvement in their breathable character. Waterproof but breathable flat materials can be prepared from the melt from polymer resin mixtures consisting of at least two different melt processable polyurethanes, characterized in that the different thermoplastic polyurethanes have soft segments with different chemical constitutions, wherein the thermoplastic polyurethane which forms the matrix is present in an amount of from 70% to 95 wt.% with reference to the total weight of thermoplastic polyurethanes used for melt processing, and is a polyurethane with an ether based soft segment, wherein the ether segment has a carbon/oxygen atomic ratio of at least two and at most three to produce a flat material. The flat materials according to the invention have a higher permeability to water vapour, determined according to DIN 53 122, and lower water absorption, determined according to DIN 53 495, method C, than flat materials made from one of the polyurethanes used for the polymer resin mixtures.

The TPU/TPU mixtures according to the invention consist of at least two different TPUs I and II, which essentially differ in their soft segment, i.e. in the long-chain diol contributing to the elastic material properties.

TPUs suitable for the mixtures according to the invention are characterised in that they are built up from linear, melt processable, segmented polyurethane molecules. These polyurethanes are mainly formed from alternating blocks of soft and rigid segments. Suitable TPUs according to the invention preferably have weight average molecular weights between 50 000 and 150 000 g/mol.

The rigid segments in TPUs I and II are formed from chain extenders A) and diisocyanates B). The soft segments in TPU I are formed from long-chain diols C) and those in TPU II from long-chain diols D), wherein C) and D) are not identical. The proportion by weight of C) in the TPU mixture according to the invention is greater than that of D), each being with respect to the total weight of the TPU raw material mixture according to the invention. The long-chain diols used for the particular TPUs I and II differ from molecule to molecule essentially with regard to their molecular weight.

The building blocks for synthesising the rigid segments may be selected from known diisocyanate and diol components for producing film raw materials made from TPU.

The chain extenders A) used are short-chain bifunctional substances whose molecular weight is between 18 and 350 g/mol. These are preferably short-chain diols. If diamines are used as chain extenders, then the polyurethane-ureas obtained can generally no longer be processed from the melt because the decomposition temperature is below the processing temperature. Preferably used dihydric alcohols are, for example, ethylene glycol, 1,2-propylene glycol, 1,4-butylene glycol, also called tetramethylene glycol, 2,3-butylene glycol, 1,5-pentanediol, 1,6-hexanediol, 1,8-octanediol, also diethylene glycol, triethylene glycol, tetraethylene glycol and higher oligoethylene glycols, dipropylene glycol and higher oligopropylene glycols and dibutylene glycol and higher oligobutylene glycols, each having a molecular weight of up to 350 g/mol.

Suitable diisocyanates B) are aliphatic, cycloaliphatic, aromatic and/or partially aromatic or heterocyclic diisocyanates, described in general by the formula

in which
Q represents an aliphatic hydrocarbon group with 2 to 18, preferably 6 to 10, carbon atoms, a cycloaliphatic hydrocarbon group with 4 to 15 carbon atoms or a partially aromatic or aromatic hydrocarbon group with 6 to 15, preferably 6 to 13, carbon atoms.

Examples of such diisocyanates are, 1,4-tetramethylene diisocyanate, 1,6-hexamethylene diisocyanate, cyclohexane-1,3 and 1,4 diisocyanates and any mixture of these isomers, naphthylene-1,5 diisocyanate, 2,4 and 2,6-diisocyanatotoluene and any mixture of these isomers, diphenylmethane-2,4' and/or 4,4' diisocyanate.

To construct the long-chain dials C) forming the soft segment matrix, polyetherdiols with a highly hydrophilic character are preferred. These are preferably polyetherdiols with a high proportion of $C_2$-building blocks between the ether bonds.

Long-chain diols intended for constructing the soft segment matrix are in particular polyetherdiols or oligoetherdiols which are prepared by known methods, for example by anionic polymerisation with alkali metal hydroxides such as sodium or potassium hydroxide, or alkali metal alcoholates such as sodium methylate, sodium or potassium ethylate or potassium isopropylate as catalysts, or by cationic polymerisation with Lewis acids such as antimony pentachloride, boron fluoride etherate, etc, as catalysts, from one or several alkylene oxides or cyclic ethers with preferably 2 to 4 carbon atoms in the alkylene unit and optionally a starter molecule which contains at least two bonded reactive hydrogen atoms.

Suitable compounds are, for example, tetrahydrofuran, 1,3-propylene oxide, 1,2 and 2,3-butylene oxide, and also styrene oxide and in particular ethylene oxide and 1,2-propylene oxide. The alkylene oxides may be used individually, alternating one after the other or as mixtures during ionic polymerisation. The proportion by weight of units derived from ethylene oxide is preferably greater than 50%, with respect to the total weight of diol. Suitable starter molecules are, for example: water, organic dicarboxylic acids such as succinic acid, adipic acid, phthalic acid and terephthalic acid, aliphatic and aromatic, optionally substituted alkylamines and diamines. Other possible starter molecules are alkanolamines such as ethanolamine, diethanolamine, N-methyl and N-ethyl-ethanolamine, and also N-methyl and N-ethyl diethanolamine.

Polyhydric, especially dihydric, alcohols such as ethanediol, 1,3 and 1,2-propanediol, diethylene glycol, dipropylene glycol, 1,4-butanediol and 1,6-hexanediol are preferably used.

These polyetherdiols or oligoetherdiols C) preferably possess a functionality of 2 and average molecular weights of 250 to 8000 g/mol, particularly preferably 600 to 4000 g/mol. The average carbon/oxygen atomic ratio is preferably between 2 and 3.

Long-chain diols D) suitable for constructing the soft segments in TPU II in the TPU/TPU mixtures according to the invention can be either etherpolyols or esterpolyols.

Suitable polyesterdiols are, for example, the reaction products of dihydric low molecular weight alcohols with dibasic carboxylic acids which preferably have terminal hydroxyl groups. Instead of the free dicarboxylic acids, the corresponding dicarboxylic anhydrides or dicarboxylic esters of low molecular weight alcohols or mixtures of these may also be used to prepare the polyester. The dicarboxylic acids may be aliphatic, cycloaliphatic, aromatic and/or heterocyclic in nature. Preferred carboxylic acids and their derivatives are succitic acid, adipic acid, suberic acid, azelaic acid, sebacic acid, phthalic acid, isophthalic acid and phthalic anhydride. Suitable lower molecular weight diols are the molecules also described as chain extenders. Ethylene glycol, butylene glycol-1,4 and hexanediol-1,6 are preferably used here.

Possible etherpolyols D) are prepared by the methods described above from one or more alkylene oxides or cyclic ethers with more than 2 carbon atoms in the alkylene unit and optionally a starter molecule which contains at least two bonded reactive hydrogen atoms. Possible examples of compounds for building up the soft segments are mentioned above. If etherpolyols are used for resin component TPU II in the TPU resin mixture according to the invention, then the etherpolyol must differ in chemical composition from the resin component TPU I. This is characterised by a larger carbon/oxygen ratio for component TPU II than for component TPU I.

The diols C) forming the soft segment in component TPU II preferably have a functionality of 2 and average molecular weights of 500 to 10 000 g/mol, in particular 1000 to 5000 g/mol.

Again, mixtures of different TPUs may be used as component TPU II, these being characterised in that the TPUs used have different soft segments from those described by D) for the same chemical composition of rigid segment.

Raw materials for TPU mixtures according to the invention may be, for example, those resins known under the trade names Desmopan, Elastollan, Estane, Irograne, Morthane, Texin and Tecoflex.

In the resin mixtures according to the invention, component TPU I forms the matrix, TPU II forms the minority component. To produce the set of properties according to the invention, the preferred proportion by weight of TPU I is between 70 and 95 wt. %, that of TPU II between 5 and 30 wt. %, each with respect to the total weight of the TPU resin used for further processing.

The TPU I and TPU II used for resin mixtures according to the invention should not exhibit obvious differences with regard to their flow properties. The difference in melt flow indices of the TPU resin materials used should not exceed 20 g/10 min when the melt flow indices are determined according to DIN 53 735 at 190° C. with a test load of 10 kg. DIN 53 735 is the national German standard corresponding to ISO 1133–1981. Resin mixtures according to the invention can be prepared from mixtures of different thermoplastic polyurethanes wherein at least three different soft segments are introduced into the resin mixture through these different thermoplastic polyurethanes wherein, apart from the ether-polyurethane with a carbon/oxygen atomic ratio of at least two and less than three forming the matrix, a further ether-polyurethane with a carbon/oxygen atomic ratio of at least three is used.

It was not obvious that, by mixing different melt processable polyurethanes, the water vapour permeability of flat materials made from these mixtures would be higher than that of the individual components and that the absorbtion of water could be reduced in this way.

Apart from the property advantages described, mixing comparatively expensive, hydrophilic TPUs with ordinary polyurethanes offers the advantage of reducing the costs of the raw materials used.

To improve and/or to retain performance properties, the films according to the invention can be provided with dyes, functional additives and/or stabilizers commonly used for plastics. These additives are used in the effective quantities usual for plastics. They are preferably added as master batches or concentrates of active substances. In addition to thermoplastic polyurethanes, the polymer resin mixture can contain a proportion of up to 8 wt. % of inorganic additives with a spacer effect and a proportion of at least 0.3 wt. % and at most 1 wt. % of waxes such as amide waxes, each being with reference to the total weight of raw materials used for melt processing to produce flat materials.

Flat materials according to the invention are films that can be produced for example, by tubular film or flat film extrusion.

Preferably, the flat materials according to the invention have a preferred thickness of between 10 $\mu$m and 100 $\mu$m and a particularly preferred thickness of between 15 $\mu$m and 30 $\mu$m.

The flat materials according to the invention can be used as a membrane with a selective barrier effect towards liquid and/or solid media while at the same time having a high permeability for water vapour and other gases.

Further, the flat materials according to the invention can be used as breathable coverings for porous sheet materials made from woven fabrics and/or non-woven fabrics such as breathable textiles.

The flat materials of the invention can be used to seal mattresses and/or cushions and/or cloths against mites, bacteria and other microorganisms and/or their metabolic products.

Also, the flat films according to the invention can be used for sealing purposes during shaping procedures with reactive foam systems.

EXAMPLES

The invention is explained in more detail in the following, using examples. For these examples, polyurethane resin mixtures were processed to give films, the processing properties were recorded during production and the properties of the films obtained were checked. For this, melt extrusion processing on a blown film plant was selected for the formulations described below.

All the granular materials used were dried at 70° C. to a residual moisture content of 0.01% in a commercial air dryer of the Somos type. The dew point of the dry air was −35° C. The pre-dried TPU resin granules were batch-mixed in a Rhönrad drum mixer.

The TPUs described in the following were used to produce example films.

1. TPU 1

This is a linear etherurethane with a Shore hardness of about 90 A and a melt flow index, measured according to DIN 53 735 at 190° C. and a test load of 10 kg, of 32 g/10 min. This TPU was built up from the building blocks 4,4'-diphenylmethane diisocyanate, butanediol as the chain extender and a Poly(ethylene oxide) based polydiol with a molecular weight of about 1000 g/mol.

2. TPU 2

This TPU was a linear etherurethane with a Shore hardness of about 75 A and a melt flow index measured according to DIN 53 735 at 190° C. and a test load of 10 kg, of 30 g/10 min. The TPU was built up from the building blocks 4,4'-diphenylmethane diisocyanate, butanediol as chain extender and a poly(propylene oxide) based polydiol with a molecular weight of about 1500 g/mol.

3. TPU 3

This linear etherurethane with a Shore hardness of about 85 A had a melt flow index, measured according to DIN 53 735 at 190° C. and a test load of 10 kg, of 17 g/10 min. The TPU used here was prepared from the building blocks 4,4'-diphenylmethane diisocyanate, butanediol as chain extender and a poly(oxytetramethylene)diol with a molecular weight of about 1000 g/mol.

4. TPU 4

Here, a linear esterurethane with a Shore hardness of about 88 A and a melt flow index, measured according to DIN 53 735 at 190° C. and a test load of 10 kg, of 15 g/10 min was selected. This TPU was composed of the building blocks 4,4'-diphenylmethane diisocyanate, butanediol as chain extender and a poly(butylenadipate)diol with a molecular weight of about 2000 g/mol.

Example 1

A resin mixture of 95 wt. % of TPU 1 and 5 wt. % of TPU 3 was used.

Example 2

A resin mixture of 90 wt % of TPU 1 and 10 wt. % of TPU 3 was used.

Example 3

A resin mixture of 85 wt % of TPU 1 and 15 wt. % of TPU 3 was used.

Example 4

A resin mixture of 85 wt. % of TPU 1 and 15 wt. % of TPU 2 was used.

Example 5

A resin mixture of 95 wt. % of TPU 1 and 5 wt. % of TPU 4 was used.

Example 6

A resin mixture of 85 wt. % of TPU 1 and 7.5 wt. % of each of TPU 2 and TPU 3 was used.

Example 7

A resin mixture of 80 wt. % of TPU 1 and 10 wt. % of each of TPU 2 and TPU 3 was used.

Comparison example 1

Exclusively TPU 1 was used as the resin.

Comparison example 2

Exclusively TPU 2 was used as the resin.

Comparison example 3

Exclusively TPU 3 was used as the resin.

Comparison example 4

Exclusively TPU 4 was used as the resin.

The compositions of the TPU resins used stated above are each with reference to the total weight of polymer resin used. All the raw material mixtures in the examples above were tumbled together with an additional 5 wt. % of silica and 1 wt. % of an amide wax, each with reference to the total weight of raw materials used to produce the film.

The polyurethane mixtures were melted with a commercial single-screw extruder. This had an internal diameter (D) of 45 mm, a water-coolable grooved feeding section and a length of 25 D. The extruder was operated with a partially double flighted three-zone-screw (barrier screw) which was also fitted with a dispersive mixing section and a distributive mixing section. At the metering zone, the dispersive mixing section, of the Maddock type, often called the shearing section, with a length of 3 D was encountered first of all. For distributive mixing, a dynamic mixing section with diamond-shaped slotted slider, also of length 3 D, was used. The mode of action of this screw structure is described, for example, by the Davis-Standard Co. in the following literature reference: Paper, Film & Foil Converter, number 6 (1990) 84–90. The melt was passed through a screen pack whose finest screen had a mesh size of 900 mesh per $cm^2$. The temperature profile in the extruder rose from 160° C. at the feeding section to 200° C. in the region of the mixing section.

As a blown film die, a single-layer die with a spiral mandrel holder construction, with a die ring diameter of 130 mm and a die gap of 0.8 mm, was used. The blown film die was heated to 200° C.

The blown tubular film, widened to 235 mm, was blasted with cool air via a cooling ring with a diameter of 175 mm. It was collapsed by means of air cushion collapsing boards and squeezed through a compression device with a polished stainless steel roll and a rubber covered backing roll. The edge strips of the film obtained were cut off with vertical blades, the two strips of film being separated and wound onto a tandem winder.

TABLE 1

Extrusion parameters speed of rotation, current consumption, melt pressure and melt temperature for the polyurethane mixtures processed in the scope of the examples and comparison examples

| Unit | Speed of rotation rpm | Current consumption A | Melt pressure bar | Melt temp. °C |
|---|---|---|---|---|
| Example 1 | 30 | 16 | 370 | 206 |
| Example 2 | 31 | 18 | 360 | 204 |
| Example 3 | 30 | 18 | 380 | 204 |
| Example 4 | 30 | 19 | 375 | 203 |
| Example 5 | 31 | 16 | 375 | 205 |
| Example 6 | 31 | 14 | 370 | 204 |
| Example 7 | 30 | 16 | 390 | 203 |
| Comp. ex 1 | 30 | 16 | 320 | 208 |
| Comp. ex 2 | 30 | 26 | 285 | 210 |
| Comp. ex 3 | 29 | 12 | 300 | 202 |
| Comp. ex 4 | 28 | 19 | 420 | 209 |

The translucent film samples obtained under the conditions described were checked with regard to the quantities important for improved breathability. The following tests were performed:

Determining the Thickness of the Layer

The thickness of the film was determined mechanically according to DIN 53 370, using feelers.

Determining Water Absorption

Water absorption after storage for 24 hours in deionised water at 23° C., was measured according to DIN 53 495, method C. This standard corresponds to ISO/R 62 - 1958.

Determining Permeability to Water Vapour

Permeability to water vapour was determined according to DIN 53 122. Measurements were made at a temperature of 23° C. and a relative humidity of 85 %. This national German standard corresponds to ASTM E 96, procedure A. Standardisation to a unit layer thickness of 30 $\mu$m was achieved by multiplying by the experimentally determined layer thickness and dividing by the unit layer thickness.

Determining Tear Strength and Elongation at Break

Tear resistance and elongation at break were determined according to DIN 53 455. In this, test strips with a clamping distance of 100 mm were used. The samples were taken from the strips of film at a 900 angle to the take-off direction.

Table 2 shows a comparative overview of the properties of the films produced from the raw materials mixtures according to the invention.

TABLE 2

Overview of properties of flat materials produced in the scope of the examples and comparison examples.

| Unit | water absorption % | Thickness $\mu$m | Water vapour permeability (WVP) gm$^{-2}$ 24 h$^{-1}$ | WVP standardised to 30 $\mu$m thick film gm$^{-2}$ 24 h$^{-1}$ | Tear Strength Nmm$^{-2}$ | Elongation at break % |
|---|---|---|---|---|---|---|
| EX. 1 | 24.1 | 30 | 595 | 595 | 34.8 | 644 |
| EX. 2 | 22.9 | 28 | 659 | 615 | 35.1 | 719 |
| EX. 3 | 20.5 | 31 | 571 | 590 | 29.8 | 647 |
| EX. 4 | 21.7 | 29 | 616 | 595 | 38.5 | 608 |
| EX. 5 | 22.0 | 32 | 548 | 585 | 37.6 | 722 |
| EX. 6 | 20.6 | 29 | 672 | 650 | 35.3 | 650 |
| EX. 7 | 20.4 | 28 | 675 | 630 | 41.2 | 678 |
| Comp. ex 1 | 28.2 | 32 | 544 | 580 | 35.0 | 678 |
| Comp. ex 2 | 4.8 | 30 | 514 | 514 | 36.4 | 843 |
| Comp. ex 3 | 2.9 | 31 | 445 | 460 | 27.9 | 631 |
| Comp. ex 4 | 1.1 | 28 | 332 | 310 | 64.1 | 540 |

Assessing the Flat Materials Made from TPU Raw Material Mixtures According to the Invention Table 2 shows that properties of the end products from starting materials according to the invention specified in the examples are superior to those from the raw materials used in the comparison examples.

Compared with the TPU resin material suitable for breathable sheet materials representative of the prior art, in comparison example 1, there is, for example, an improvement in properties in the two essential areas for an increase in application properties such as, e.g. the user comfort of the breathable textiles, permeability to water vapour and water absorption.

Polyethylenoxide is known for its high tendency to crystallise so that it may crystallise even as soft segments. Crystalline areas of polymers are generally found to be impermeable because there is no possibility of the spaces therein changing in any way, thus hindering the transport of materials. A reduction in the crystalline fraction brings advantages. The most important material transport phenomenon with regard to a breathable character is permeability to water vapour.

The permeability to water vapour cannot be increased in comparison with the comparison films without a clear increase in the proportion of soft segment phases. This phenomenon can only occur if the TPU resins are mixed together sufficiently well for the various soft segments to be mixed at the molecular level because otherwise there is a reduction in the WVP to the extent that the higher percentage by volume of permeable material is shielded by the less permeable resin.

The small change in tear strength emphasises the compatibility of the raw materials used. The unchanged high tear strength due to homogeneous mixing is due to the high bonding energies of the intermolecular hydrogen bridge bonds in the rigid segments.

The increased permeability to water vapour enables improved transport, for example by transpiration, of moisture which is released. Reduced water absorption means that the increase in weight of the textile due to absorbed moisture is much smaller and the lower weight provides the wearer of the textile with more acceptable wearer properties.

I claim:

1. Waterproof but breathable flat materials prepared from the melt from polymer resin mixtures consisting of at least two different melt processable polyurethanes, wherein the different thermoplastic polyurethanes have soft segments with different chemical constitutions, wherein the thermoplastic polyurethane which forms the matrix is present in an amount of 70–95 wt. % with reference to the total weight of thermoplastic polyurethanes used for melt processing and is a polyurethane with a soft segment prepared from etherdiols, wherein the ether segment has a carbon/oxygen atomic ratio of at least two and at most three wherein the polymer resins are admixed while in the melt, said melt being melt processed to produce a flat material, wherein the flat materials according to the invention have a higher permeability to water vapour, determined according to DIN 53 122 than flat materials made from only one of the individual polyurethanes used for the polymer resin mixture.

2. Flat materials according to claim 1, wherein the polymer resin mixture contains, in addition to thermoplastic polyurethanes, a proportion of up to 8 wt. % of inorganic additives and a proportion of at least 0.3 wt. % and at most 1 wt. % of waxes, each being with reference to the total weight of raw materials used for melt processing to produce flat materials.

3. Flat materials according to claim 1, wherein the polymer resin mixture contains sufficient different thermoplastic polyurethanes to introduce at least three different soft segments into the resin mixture wherein, the matrix polyurethane has a soft segment prepared from an etherdiol having a carbon/oxygen atomic ratio of at least two and less than three, and a further polyurethane having a soft segment prepared from an etherdiol being at least one of the other urethanes and having a carbon/oxygen atomic ratio of at least three is used.

4. Flat materials according to claim 1, wherein the flat materials according to the invention have a thickness of between 10 $\mu$m and 100 $\mu$m.

5. Flat materials according to claim 4, wherein the flat materials have a thickness between 15 $\mu$m and 30 $\mu$m.

6. Flat materials according to claim 1, wherein the flat materials have been produced by tubular film or flat film extrusion.

7. Flat materials according to claim 1, which further have a water absorption determined according to DIN 53 495, method C, which is lower than a flat material produced from at least one of the polyurethanes used for the polymer resin mixture.

8. A method of covering a porous material with a membrane having a selective barrier effect toward liquid or solids while at the same time having a high permeability for water vapor and other gases which comprises applying to said Porous material a flat material according to claim 1.

9. The method according to claim 8, wherein the porous material is a woven or non-woven fabric.

10. A method for sealing a mattress cushion or cloth against mites, bacteria and microorganisms or their metabolic product which comprises applying to said mattress, cushion or cloth a flat material according to claim 1.

11. A method for sealing materials during shaping procedures with reactive foam systems which comprises applying to said materials a flat material according to claim 1.

* * * * *